(12) United States Patent
Gupta et al.

(10) Patent No.: US 10,827,558 B2
(45) Date of Patent: Nov. 3, 2020

(54) TECHNIQUES AND APPARATUSES FOR COMMUNICATION RELAY DISCOVERY

(71) Applicant: QUALCOMM Incorporated, San Diego, CA (US)

(72) Inventors: Piyush Gupta, Bridgewater, NJ (US); Junyi LI, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/633,502

(22) Filed: Jun. 26, 2017

(65) Prior Publication Data
US 2018/0376532 A1    Dec. 27, 2018

(51) Int. Cl.
*H04L 12/00* (2006.01)
*H04W 88/04* (2009.01)
(Continued)

(52) U.S. Cl.
CPC .......... *H04W 88/04* (2013.01); *H04W 8/005* (2013.01); *H04W 52/0229* (2013.01);
(Continued)

(58) Field of Classification Search
None
See application file for complete search history.

(56) References Cited

U.S. PATENT DOCUMENTS

| | | |
|---|---|---|
| 9,609,461 B2 | 3/2017 | Ge et al. |
| 2013/0016630 A1* | 1/2013 | Bhushan ............... H04W 48/12 370/255 |

(Continued)

FOREIGN PATENT DOCUMENTS

| | | |
|---|---|---|
| WO | WO-2015183475 A1 | 12/2015 |
| WO | WO-2016073984 A2 | 5/2016 |
| WO | WO-2016164808 A1 | 10/2016 |

OTHER PUBLICATIONS

CATT: "Considerations on D2D Discovery," 3GPP Draft; R2-133216 Considerations on D2D Discovery, 3rd Generation Partnership Project (3GPP), Mobile Competence Centre; 650, Route Des Lucioles; F-06921 Sophia-Antipolis Cedex; France, vol. RAN WG2, No. Ljubljana, Slovenia; 20131007-20131011, Sep. 27, 2013 (Sep. 27, 2013), XP050718927, pp. 1-3, Retrieved from the Internet: URL: http://www.3gpp.org/ftp/tsg_ran/WG2_RL2/TSGR2_83bis/Docs/ [retrieved on Sep. 27, 2013].
(Continued)

*Primary Examiner* — Noel R Beharry
*Assistant Examiner* — Lionel Preval
(74) *Attorney, Agent, or Firm* — Steven R. Thiel

(57) ABSTRACT

User equipments (UEs) may transmit periodic discovery broadcasts to enable another UE to establish a relay connection to a network. When the UEs transmit respective discovery broadcasts, the discovery broadcasts may cause excessive utilization of network or battery resources. In some aspects, described herein, a first UE, based at least in part on failing to receive a periodic discovery broadcast, may transmit a search signal. A second UE may refrain from transmitting periodic discovery broadcasts based at least in part on a first energy metric not satisfying a first energy metric threshold, but may transmit a discovery broadcast as a response to the search signal based at least in part on a second energy metric satisfying a second energy metric threshold, thereby enabling the first UE to establish a connection to a base station using the second UE as a relay.

30 Claims, 10 Drawing Sheets

(51) Int. Cl.
*H04W 8/00* (2009.01)
*H04W 52/02* (2009.01)
*H04W 76/14* (2018.01)
*H04B 7/26* (2006.01)

(52) U.S. Cl.
CPC .......... *H04W 76/14* (2018.02); *H04B 7/2606* (2013.01); *H04W 52/0216* (2013.01); *H04W 52/0241* (2013.01)

(56) References Cited

U.S. PATENT DOCUMENTS

| | | | |
|---|---|---|---|
| 2014/0171062 A1* | 6/2014 | Fallgren | H04W 40/22 455/422.1 |
| 2015/0031353 A1* | 1/2015 | Hakola | H04W 48/16 455/422.1 |
| 2015/0038136 A1* | 2/2015 | Wu | H04W 48/08 455/434 |
| 2016/0088668 A1 | 3/2016 | Kim et al. | |
| 2016/0100304 A1 | 4/2016 | Kim et al. | |
| 2016/0269486 A1 | 9/2016 | Gupta et al. | |
| 2016/0381720 A1 | 12/2016 | Baek et al. | |
| 2017/0111754 A1 | 4/2017 | Baghel et al. | |
| 2018/0041889 A1* | 2/2018 | Chen | H04W 40/02 |
| 2018/0152234 A1* | 5/2018 | Huang | H04W 36/06 |
| 2018/0310293 A1* | 10/2018 | Lee | H04W 72/0406 |

OTHER PUBLICATIONS

Partial International Search Report—PCT/US2018/029805—ISA/EPO—Jul. 13, 2018.
ZTE: et al., "Discussion on Relay Initiation and Discovery", 3GPP Draft, R2-153765—Discussion on Relay Initiation and Discovery, 3rd Generation Partnership Project (3GPP), Mobile Competence Centre, 650, Route Des Lucioles, F-06921 Sophia-Antipolis Cedex, France, vol. RAN WG2, No. Beijing, China, 20150824-20150828 Aug. 23, 2015 (Aug. 23, 2015), XP051004411, pp. 1-5, Retrieved from the Internet: URL: http://www.3gpp.org/ftp/Meetings_3GPP_SYNC/RAN2/Docs/ [retrieved on Aug. 23, 2015] the whole document.
International Search Report and Written Opinion—PCT/US2018/029805—ISA/EPO—Sep. 4, 2018.

* cited by examiner

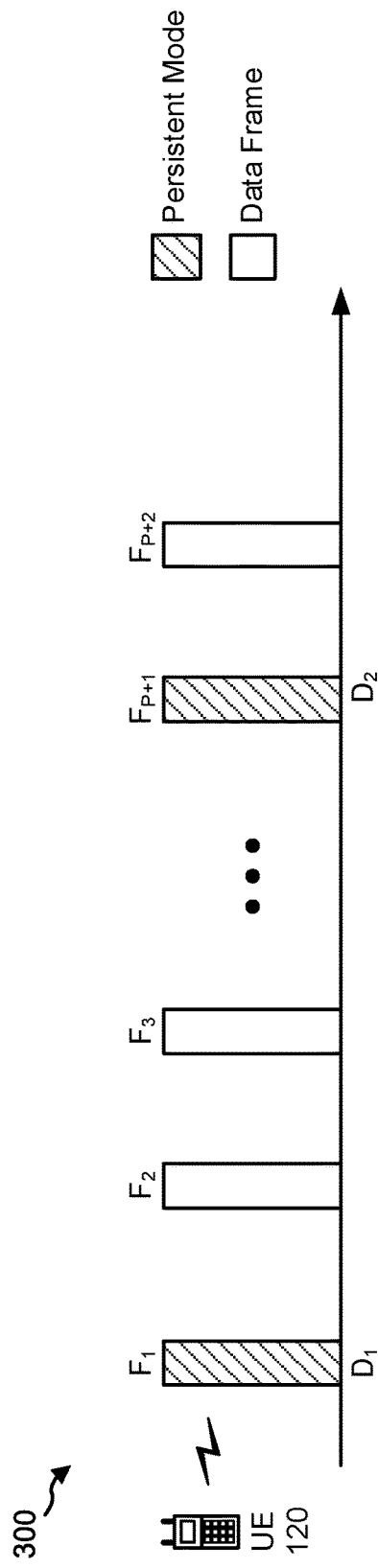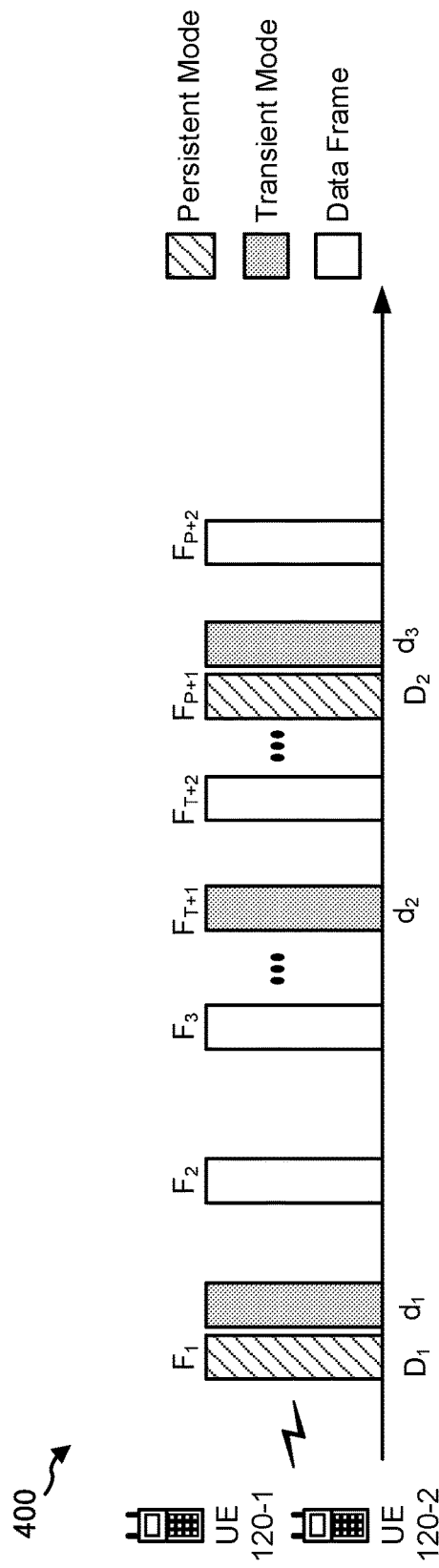

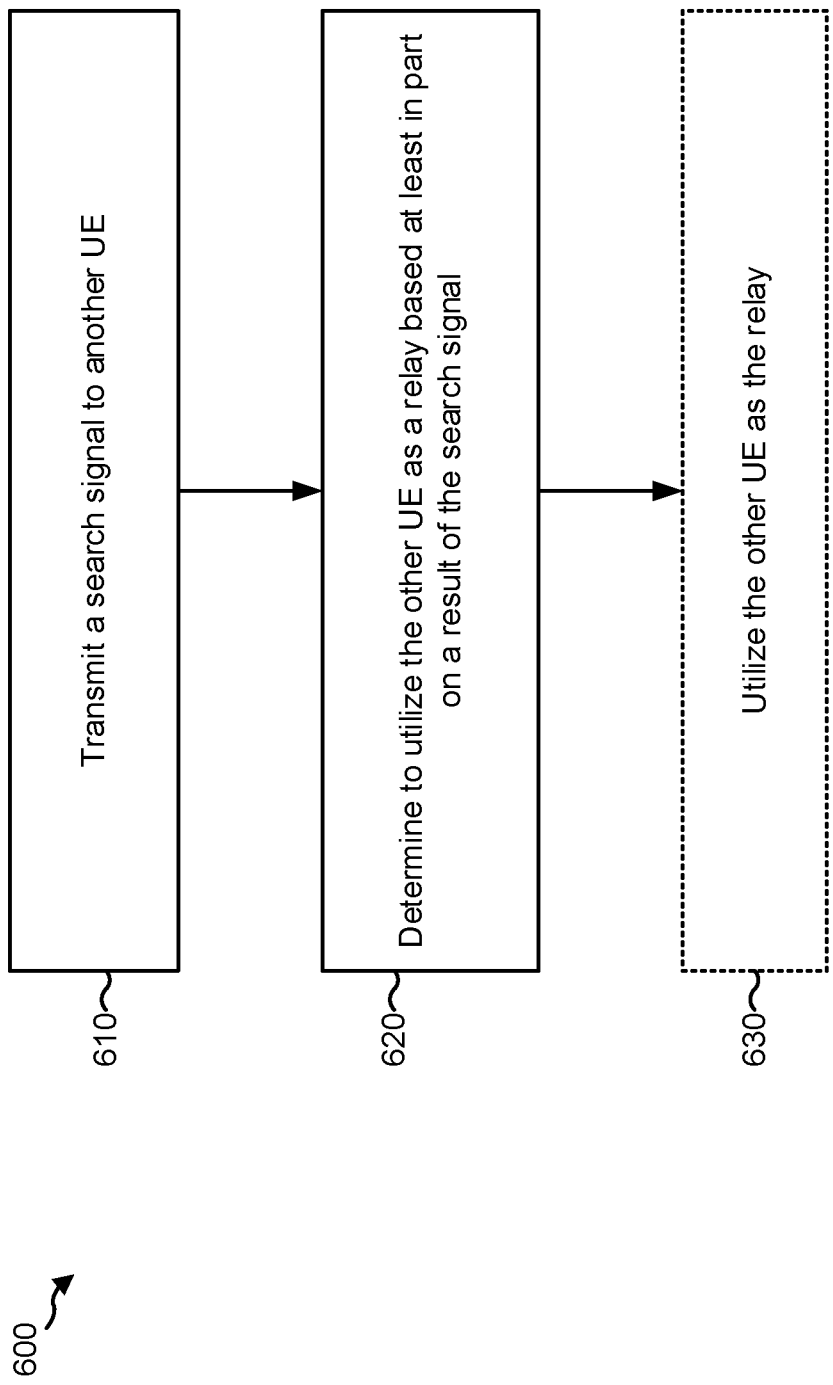

TECHNIQUES AND APPARATUSES FOR COMMUNICATION RELAY DISCOVERY

BACKGROUND

Field

Aspects of the present disclosure generally relate to wireless communication, and more particularly to techniques and apparatuses for communication relay discovery.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

Wireless devices, such an Internet of Everything (IoE) wireless devices, may be deployed in different use cases. A first type of wireless device (e.g., a first user equipment (UE)), such as an IoE sensor, may be deployed for a metering functionality, a sensing functionality, and/or the like. The first type of wireless device may be installed to operate at a static location and may be associated with less than a threshold amount of data traffic. In contrast, a second type of wireless device, such as an IoE smart wristwatch, may be deployed as a wearable device, an asset tracking device, a logistics management device, and/or the like. The second type of wireless device may be moved to different locations and may be associated with greater than a threshold amount of data traffic. It may be desirable for each use case for IoE wireless devices to achieve a threshold amount of battery life. For example, it may be desirable to obtain a battery life of at least multiple years for an approximately 5000 milliwatt-hour (mW-hr) battery installed in the first type of wireless device. In contrast, it may be desirable to obtain a battery life of at least multiple days for an approximately 1500 mW-hr battery installed in the second type of wireless device.

A network operator may deploy the wireless devices with a configured sleep state to achieve a threshold amount of battery life. For example, wireless devices may be configured to enter a sleep state when data is not to be transmitted or received, and to periodically exit the sleep state and transmit or receive data. Some of the wireless devices may be positioned at locations with limited coverage, such as in a building basement, a rural area, and/or the like. Thus, the wireless devices may be configured to operate in a mesh wide area network (WAN) to ensure connectivity. For example, a first wireless device with relatively poor coverage from a network may transmit data to a second wireless device with relatively strong coverage from the network. In this case, the second wireless device may relay the data to the network, and may be termed a relay.

To establish a connection to a relay, the first wireless device may wake from a sleep state, may fail to detect a base station, and may detect a discovery broadcast from the second wireless device located closer to the base station and connected to the base station. In this case, the first wireless device may communicate with the second wireless device to establish a relay connection, and may transmit data to the base station via the second wireless device based at least in part on establishing the relay connection. In another example, the first wireless device may communicate with the network via a plurality of other wireless devices, such as by transmitting data to a second wireless device that relays the data to a third wireless device that relays the data to a base station. However, transmission of discovery broadcasts by each wireless device with a relay path to the base station to enable establishment of a relay connection may result in excessive utilization of network resources and/or excessive utilization of battery resources by the wireless devices.

SUMMARY

Some aspects, described herein, enable push-pull discovery of a relay for a connection to a network. For example, a first wireless device (e.g., a first user equipment (UE)) may attempt to detect a discovery broadcast from a second wireless device that is configured to provide periodic discovery broadcasts, and may transmit a search signal based at least in part on failing to detect the periodic discovery broadcasts. A third wireless device that is not configured to provide periodic discovery broadcasts may receive the search signal, and may determine to provide a discovery broadcast based at least in part on receiving the search signal. The first wireless device may receive the discovery broadcast from the third wireless device, and may connect to the network using the third wireless device as a relay. This may ensure that a reduced quantity of wireless devices transmit discovery broadcasts relative to enabling all wireless devices connected to a network to transmit discovery broadcasts, thereby reducing network traffic, utilization of battery resources, and/or the like. Moreover, this may ensure that a particular wireless device is able to receive a discovery broadcast and connect to the network via another wireless device acting as a relay when wireless devices providing periodic discovery broadcasts are not detected by the particular wireless device, thereby improving network performance for the particular wireless device.

In an aspect of the disclosure, a method, an apparatus, and a computer program product are provided.

In some aspects, the method may include transmitting, by a first UE, a search signal based at least in part on failing to receive a discovery broadcast from at least one second UE associated with a first energy metric that satisfies a first type of energy metric threshold. The method may include determining, by the first UE, to utilize a third UE, associated with a second energy metric that does not satisfy the first type of energy metric threshold and a third energy metric that satisfies a second type of energy metric threshold, as a relay based at least in part on a result of the search signal, wherein the second type of energy metric threshold is different from the first type of energy metric threshold.

In some aspects, the apparatus may include a memory and at least one processor coupled to the memory. The at least one processor may be configured to transmit a search signal based at least in part on failing to receive a discovery broadcast from at least one UE associated with a first energy metric that satisfies a first type of energy metric threshold. The at least one processor may be configured to determine to utilize another UE, associated with a second energy metric that does not satisfy the first type of energy metric threshold and a third energy metric that satisfies a second type of energy metric threshold, as a relay based at least in part on a result of the search signal, wherein the second type of energy metric threshold is different from the first type of energy metric threshold.

In some aspects, the apparatus may include means for transmitting a search signal based at least in part on failing to receive a discovery broadcast from at least one UE associated with a first energy metric that satisfies a first type of energy metric threshold. The apparatus may include means for determining to utilize another UE, associated with a second energy metric that does not satisfy the first type of energy metric threshold and a third energy metric that satisfies a second type of energy metric threshold, as a relay based at least in part on a result of the search signal, wherein the second type of energy metric threshold is different from the first type of energy metric threshold.

In some aspects, the computer program product may include a non-transitory computer-readable medium storing computer executable code. The code may include code for transmitting a search signal based at least in part on failing to receive a discovery broadcast from at least one UE associated with a first energy metric that satisfies a first type of energy metric threshold. The code may include code for determining to utilize another UE, associated with a second energy metric that does not satisfy the first type of energy metric threshold and a third energy metric that satisfies a second type of energy metric threshold, as a relay based at least in part on a result of the search signal, wherein the second type of energy metric threshold is different from the first type of energy metric threshold.

In some aspects, the method may include receiving, by a first UE, a search signal from a second UE, wherein a first energy metric, associated with the first UE does not satisfy a first type of energy metric threshold and a second energy metric of the first UE satisfies a second type of energy metric threshold that is different from the first type of energy metric threshold, wherein the first type of energy metric threshold relates to transmitting discovery broadcasts periodically, and wherein the second type of energy metric threshold relates to transmitting discovery broadcasts as a response to receiving search signals. The method may include transmitting, by the first UE, a discovery broadcast based at least in part on receiving the search signal from the second UE and based at least in part on the second energy metric.

In some aspects, the apparatus may include a memory and at least one processor coupled to the memory. The at least one processor may be configured to receive a search signal from a UE, wherein a first energy metric, associated with the apparatus does not satisfy a first type of energy metric threshold and a second energy metric of the apparatus satisfies a second type of energy metric threshold that is different from the first type of energy metric threshold, wherein the first type of energy metric threshold relates to transmitting discovery broadcasts periodically, and wherein the second type of energy metric threshold relates to transmitting discovery broadcasts as a response to receiving search signals. The at least one processor may be configured to transmit a discovery broadcast based at least in part on receiving the search signal from the UE and based at least in part on the second energy metric.

In some aspects, the apparatus may include means for receiving a search signal from a UE, wherein a first energy metric, associated with the apparatus does not satisfy a first type of energy metric threshold and a second energy metric of the apparatus satisfies a second type of energy metric threshold that is different from the first type of energy metric threshold, wherein the first type of energy metric threshold relates to transmitting discovery broadcasts periodically, and wherein the second type of energy metric threshold relates to transmitting discovery broadcasts as a response to receiving search signals. The apparatus may include means for transmitting a discovery broadcast based at least in part on receiving the search signal from the UE and based at least in part on the second energy metric.

In some aspects, the computer program product may include a non-transitory computer-readable medium storing computer executable code. The code may include code for receiving a search signal from a UE, wherein a first energy metric, associated with the apparatus, does not satisfy a first type of energy metric threshold and a second energy metric of the apparatus satisfies a second type of energy metric threshold that is different from the first type of energy metric threshold, wherein the first type of energy metric threshold relates to transmitting discovery broadcasts periodically, and wherein the second type of energy metric threshold relates to transmitting discovery broadcasts as a response to receiving search signals. The code may include code for transmitting a discovery broadcast based at least in part on receiving the search signal from the UE and based at least in part on the second energy metric.

Aspects generally include a method, apparatus, system, computer program product, non-transitory computer-readable medium, user equipment, wireless device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 3 is a diagram illustrating an example of periodic discovery broadcasts.

FIG. 4 is a diagram illustrating an example of multi-mode periodic discovery broadcasts.

FIG. 6 is a flow chart of a method of wireless communication.

DETAILED DESCRIPTION

Figure 1:
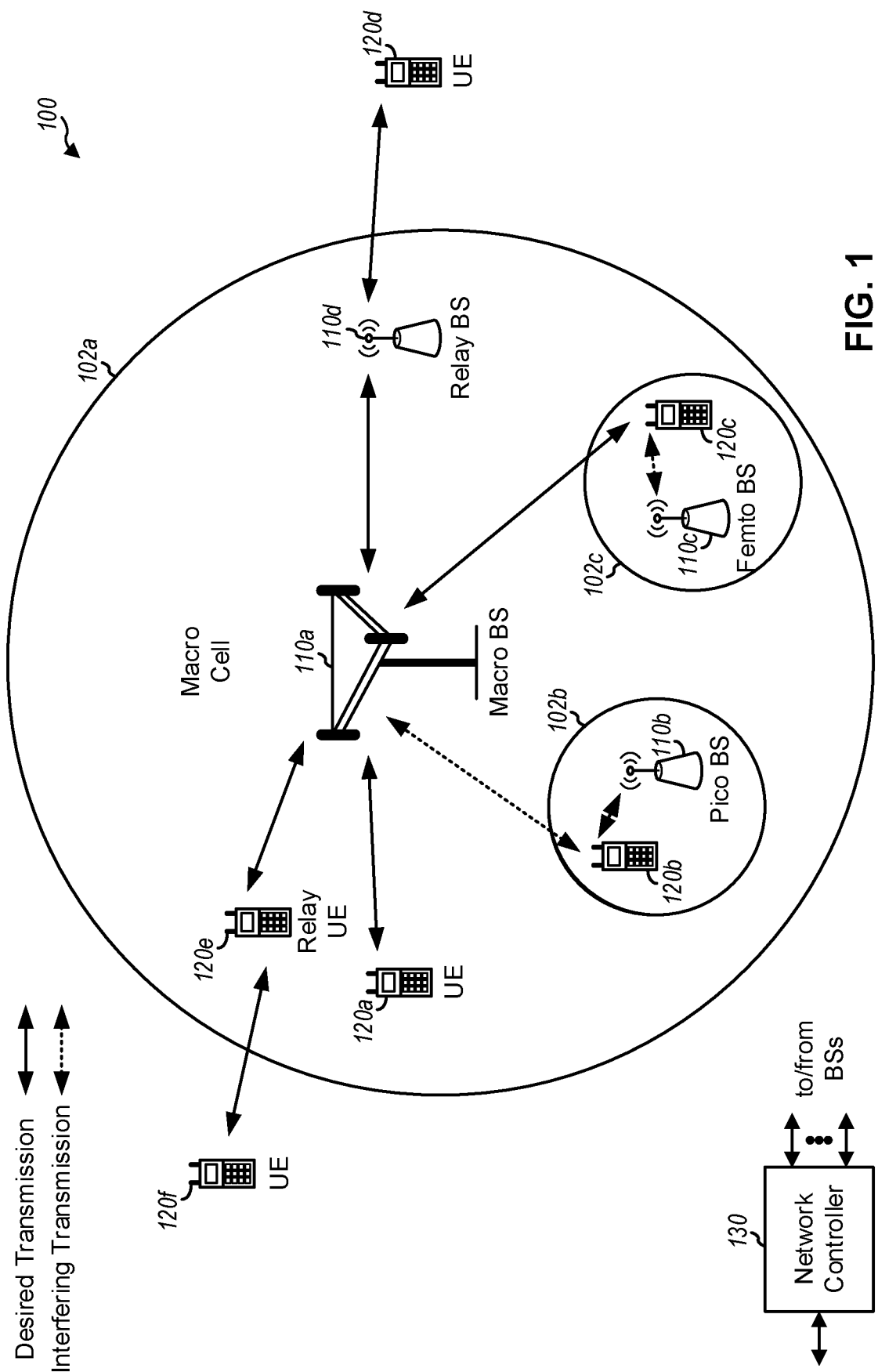
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, a relay UE, a wireless device, and/or the like. In the example shown in FIG. 1, a relay UE 120e may communicate with macro BS 110a and UE 120f to facilitate communication between BS 110a and UE 120f. In some aspects, multiple relay UEs or other relay stations may relay communication between a downstream station and an upstream station. For example, a UE may transmit a communication to a first relay UE, the first relay UE may transmit the communication to a second relay UE, and the second relay UE may transmit the communication to a BS.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e, 120f) may be dispersed throughout wireless network 100, and each UE may be stationary or mobile. A UE may also be referred to as an access terminal, a terminal, a mobile station, a subscriber unit, a station, a relay, a node, a wireless device, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or Internet of Everything (IoE) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
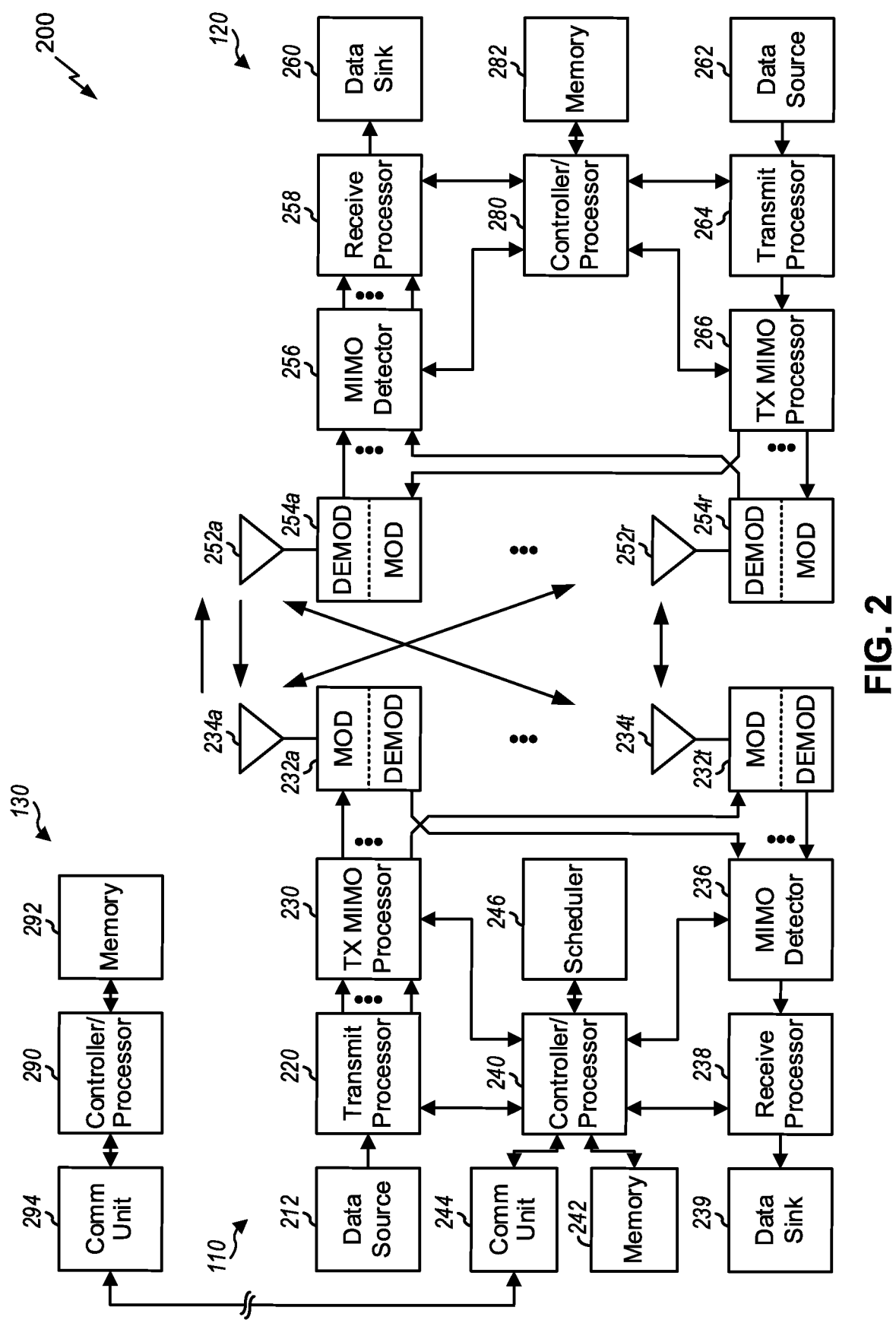
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. Additionally, or alternatively, data may be transmitted to another UE 120, such as when relaying data from base station 110 to the other UE 120, when transmitting a discovery broadcast to the other UE 120, and/or the like. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform communication relay discovery. For example, controller/processor 280 and/or other processors and modules at UE 120, may perform or direct operations of UE 120 to perform communication relay discovery. For example, controller/processor 280 and/or other controllers/processors and modules at UE 120 may perform or direct operations of, for example, method 600 of FIG. 6, method 700 of FIG. 7, and/or other processes as described herein. In some aspects, one or more of the components shown in FIG. 2 may be employed to perform example method 600 of FIG. 6, method 700 of FIG. 7, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

FIG. 3 shows an example 300 of periodic discovery broadcasts. As shown in FIG. 3, example 300 includes a UE 120.

UE 120 may be fixed at a static location for a period of time, and may be assigned a set of resources to transmit discovery broadcasts. Based at least in part on UE 120 being fixed at the static location, UE 120 may determine to operate in a persistent discovery mode. In the persistent discovery mode, UE 120 is assigned the same resources in each of a plurality of discovery frames. For example, for a set of frames $F_1, F_2, F_3, \ldots, F_{P+1}, F_{P+2}$, the UE 120 may attempt to periodically transmit a discovery broadcast based at least in part on a schedule of assigned resources. In this case, UE 120 transmits a first discovery broadcast $D_1$ using the same resources in frame $F_1$ as UE 120 uses to transmit a second discovery broadcast $D_2$ in frame, $F_2$.

As indicated above, FIG. 3 is provided merely as an example. Other examples are possible and may differ from what was described with regard to FIG. 3.

FIG. 4 shows an example 400 of multi-mode periodic discovery broadcasts. As shown in FIG. 4, example 400 includes a UE 120-1 and a UE 120-2.

UE 120-1 may be fixed at a static location for a period of time, and may operate in the persistent discovery mode, as described herein. UE 120-2 may be mobile, and may operate in a transient discovery mode. In the transient discovery mode, UE 120-2 is not pre-allocated the same resources for a plurality of frames, and thus uses different resources for a plurality of discovery broadcasts. For example, for a set of frames $F_1, F_2, \ldots, F_{T+1}, \ldots, F_{P+1}$, etc., the UE 120-2 may attempt to transmit a discovery broadcast using a randomly or pseudo-randomly selected resource in each group of a plurality of frames. In this case, the UE 120-2 transmits a first discovery broadcast $d_1$ in frame $F_1$, a second discovery broadcast $d_2$ in frame $F_{T+1}$, and a third discovery broadcast $d_3$ in frame $F_{P+1}$ using different resources in each of $F_1, F_{T+1}$, and $F_{P+1}$.

In contrast to UE 120-1, which may store information identifying resources previously used for a discovery broadcast, UE 120-2 may not store information identifying resources previously used to transmit a discovery broadcast. In some aspects, a period between discovery broadcast transmissions in the persistent mode, P, may be greater than a period between discovery broadcast transmissions in the transient mode, T, (i.e., P>T). In some aspects, P may be a multiple of T, such that each scheduled persistent mode discovery broadcast is accompanied by a transient mode discovery broadcast, but each transient mode discovery broadcast is not necessarily accompanied by a persistent mode discovery broadcast, as shown in FIG. 4. In some aspects, a transient mode discovery broadcast may be transmitted as a response to receiving a search signal, as described herein. For example, based at least in part on UE 120-2 receiving a search signal from another UE 120, UE 120-2 may select a random or pseudo-random resource for a discovery broadcast to enable the other UE 120 to utilize UE 120-2 as a relay, as described in more detail herein.

As indicated above, FIG. 4 is provided merely as an example. Other examples are possible and may differ from what was described with regard to FIG. 4.

Figure 5A:
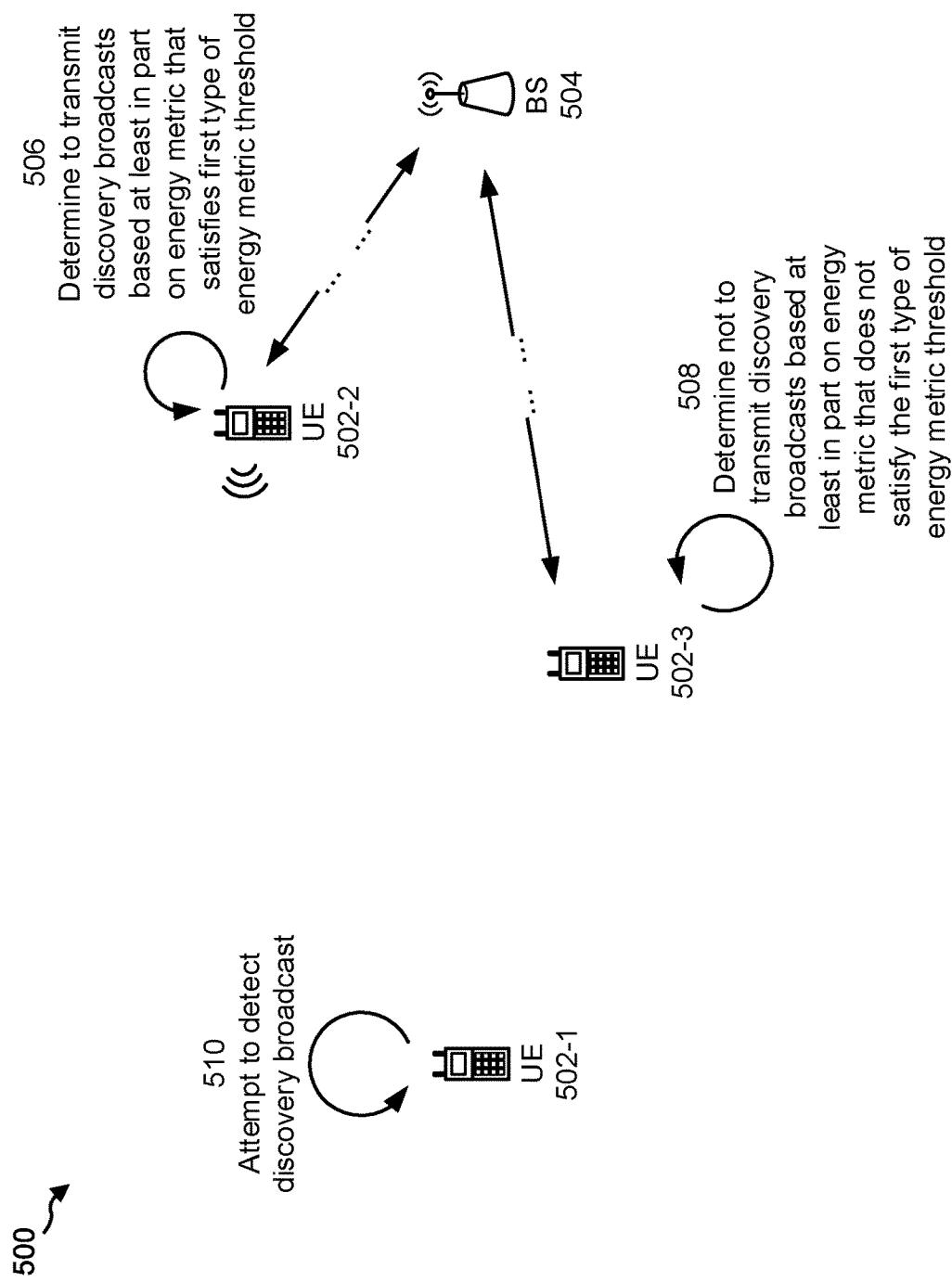
FIGS. 5A-5C are diagrams illustrating an example of communication relay discovery.
Figure 5B:
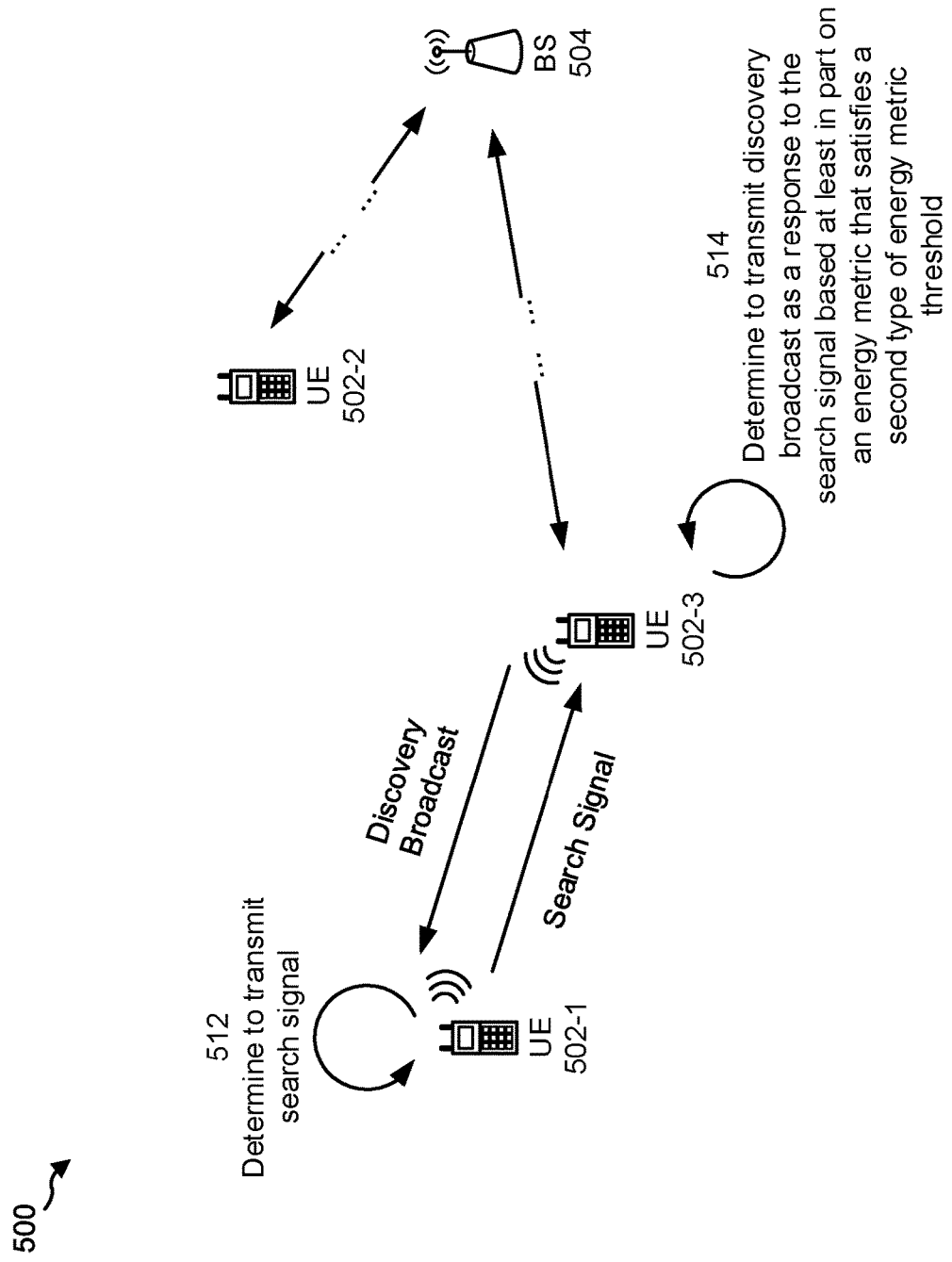
Figure 5C:
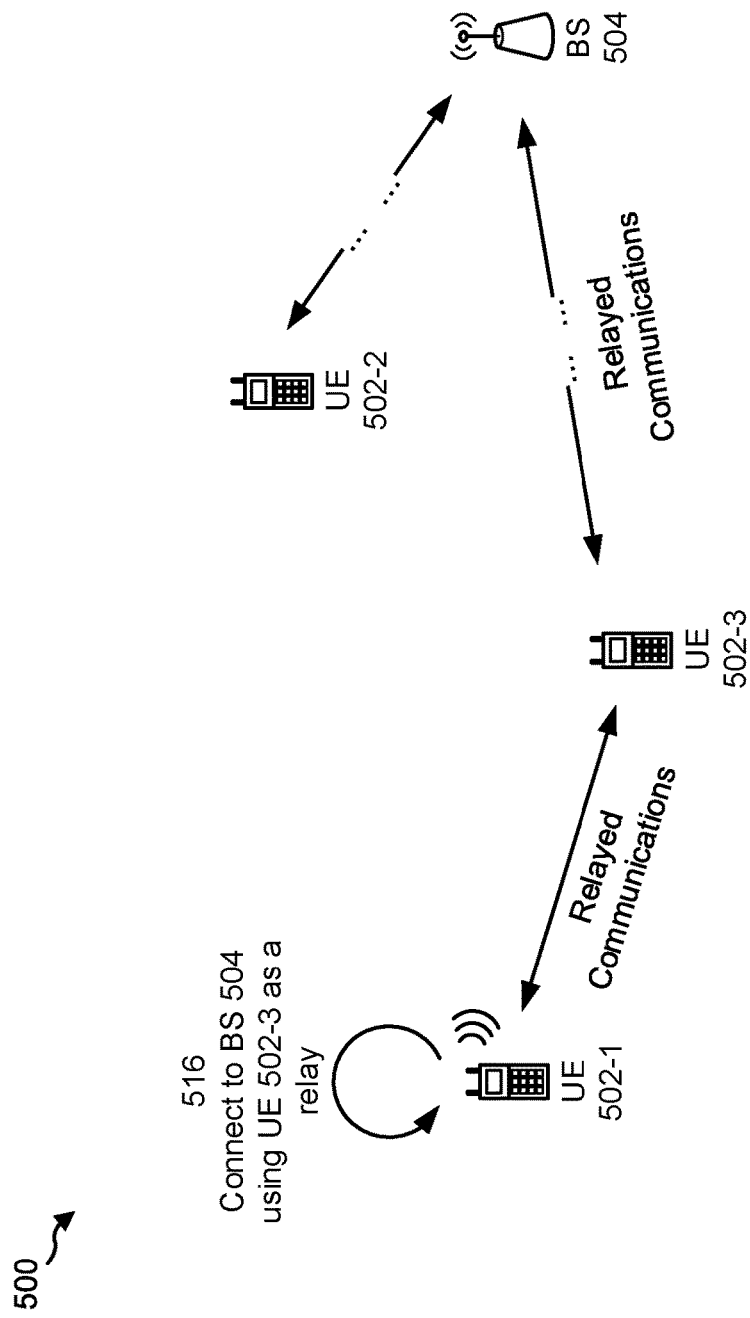

FIGS. 5A-5C are diagrams illustrating an example 500 of communication relay discovery. As shown in FIG. 5A, example 500 may include a set of UEs 502 (e.g., a UE 502-1, a UE 502-2, and a UE 502-3) (which may be referred to individually as "UE 502," and collectively as "UEs 502") and a BS 504. UEs 502 may correspond to UE 120. BS 504 may correspond to BS 110.

As shown in FIG. 5A, and at 506, UE 502-2, which may be a static UE corresponding to UE 120-1 in FIG. 4 and which may be in communication with BS 504 directly or via one or more intermediate nodes, may determine to transmit discovery broadcasts based at least in part on an energy metric that satisfies a first type of energy metric threshold. For example, UE 502-2 may determine that UE 502-2 is associated with greater than a threshold battery life, less than a threshold quantity of hops (e.g., intermediate nodes) to BS 504, greater than a threshold energy load for a path to BS 504, or a combination thereof. In some aspects, UE 502-2 may determine that the first type of energy metric threshold is satisfied based at least in part on determining that UE 502-2 is static. In this case, UE 502-2 may determine to transmit periodic discovery broadcasts to permit another UE (e.g., UE 502-1 or UE 502-3) to detect UE 502-2 and connect to UE 502-2 to utilize UE 502-2 as a relay.

At 508, UE 502-3, which may be a dynamic UE corresponding to UE 120-2 in FIG. 4 and which may be in communication with BS 504 directly or via one or more intermediate nodes, may determine not to transmit discovery broadcasts based at least in part on an energy metric that does not satisfy the first type of energy metric threshold. For example, UE 502-3 may determine that UE 502-3 is associated with less than a threshold battery life, greater than a threshold quantity of hops to BS 504, less than a threshold energy load for a path to BS 504, or a combination thereof. In some aspects, UE 502-3 may determine that the first type of energy metric threshold is satisfied based at least in part on determining that UE 502-3 is dynamic (i.e., moving). In this case, UE 502-3 may determine to avoid transmitting periodic discovery broadcasts to increase a likelihood that another UE (e.g., UE 502-1) does not select UE 502-3 and does select, for example, UE 502-2 as a relay, thereby improving a network connection for UE 502-1 relative to UE 502-1 connecting to UE 502-3. Moreover, based at least in part on avoiding transmitting discovery broadcasts, UE 502-3 reduces a utilization of network resources, battery resources, and/or the like relative to transmitting periodic discovery broadcasts.

In some aspects, UE 502-3 may determine to transmit a discovery broadcast in transient mode as a response to receiving a search signal from another UE (e.g. UE 502-1) at a subsequent time. In some aspects, UEs 502 (e.g., UE 502-2 and UE 502-3) may determine the first type of energy metric threshold (and/or a second type of energy metric threshold, as described herein) based at least in part on receiving signaling from BS 504. For example, BS 504 may transmit a system information block (SIB) message identifying an energy metric threshold. In some aspects, the energy metric threshold may be adapted to a transmission time scale for UEs 502. For example, based at least in part on a particular type of UE 502 that is operating in a network with a particular data transmission rate, BS 504 may alter the energy metric threshold to ensure that relay connections can accommodate the particular data transmission rate.

At 510, UE 502-1, which may not be in communication with BS 504, may attempt to detect a discovery broadcast to identify another UE 502 for use as a relay. For example, UE 502-1 may attempt to detect the discovery broadcast during network resources allocated for persistent mode discovery broadcasts, during network resources during which transient mode discovery broadcasts may occur, and/or the like. In this case, UE 502-1 may fail to detect a discovery broadcast such as, for example, the discovery broadcast transmitted by UE 502-2.

As shown in FIG. 5B, and at 512, based at least in part on not detecting a discovery broadcast, UE 502-1 may determine to transmit a search signal. For example, after attempting to detect a discovery broadcast from UEs 502 that are configured to transmit periodic discovery broadcasts (e.g., UEs 502 associated with an energy metric that satisfies a first type of energy metric threshold), UE 502 may determine to transmit the search signal to trigger another UE 502. The other UE 502 may be a UE that is not configured to transmit periodic discovery broadcasts (e.g., a UE 502 that is associated with an energy metric that does not satisfy the first type of energy metric threshold). In this case, the search signal may trigger the other UE 502 to transmit a discovery broadcast as a response to the search signal (e.g., based at least in part on a UE 502 being associated with an energy metric that satisfies a second type of energy metric threshold).

In some aspects, UE 502-1 may determine to transmit the search signal based at least in part on not successfully connecting to BS 504 via a relay after detecting a discovery broadcast. For example, when UE 502-1 detects a discovery broadcast (e.g., from UE 502-2) and unsuccessfully attempts to establish a connection to BS 504 using UE 502-2 as a relay, UE 502-1 may determine to transmit a search signal to identify another UE 502 for use as a relay. In some aspects, UE 502-1 may determine to transmit a search signal identifying UE 502-1. For example, UE 502-1 may transmit the search signal to trigger another UE (e.g., UE 502-3) to transmit a discovery broadcast directed to UE 502-1. Additionally, or alternatively, UE 502-1 may transmit the search signal to trigger another UE to transmit a discovery broadcast not directed to UE 502-1 (e.g., directed to a set of UEs 502, which may include UE 502-1). In some aspects, UE 502-1 may transmit the search signal using a randomly selected or pseudo-randomly selected resource of a search frame. Additionally, or alternatively, UE 502-1 may transmit the search signal using a resource pre-provisioned by, for example, BS 504 and configured using a system information block (SIB) message. In some aspects, the search signal may be a relay-search signal transmitted using a relay-search frame.

At 514, UE 502-3 may receive the search signal from UE 502-1, and may determine to transmit a discovery broadcast as a response to the search signal based at least in part on determining that an energy metric for UE 502-3 satisfies a second type of energy metric threshold. For example, based at least in part on receiving the search signal, UE 502-3 may determine another energy metric for UE 502-3 (e.g., a different energy metric than for the first type of energy metric threshold, the same energy metric as for the first type of energy metric threshold, and/or the like). In some aspects, UE 502-3 may transmit the discovery broadcast using a resource of a subsequent discovery frame (e.g., a transient mode discovery frame).

In some aspects, the second type of energy metric threshold may relate to a quantity of hops of a path to BS 504, a battery life, an energy load of a path to BS 504, or a combination thereof. For example, UE 502-3 may determine not to transmit a discovery broadcast periodically based at least in part on determining that a battery life of UE 502-3 does not satisfy a first battery life threshold of the first type of energy metric threshold, and may determine to transmit a discovery broadcast as a response to receiving the search signal based at least in part on determining that the battery life of UE 502-3 does satisfy a second battery life threshold of the second type of energy metric threshold. In some aspects, UE 502-3 may transmit the discovery broadcast directly to UE 502-1 to enable UE 502-1 to select UE 502-3 as a relay. For example, UE 502-3 may transmit a discovery broadcast including information, such as a device identifier, identifying UE 502-1 as a target for the discovery broadcast. Additionally, or alternatively, UE 502-3 may transmit the discovery broadcast to a plurality of UEs to enable the plurality of UEs to select UE 502-3 as a relay.

In some aspects, UE 502-3 may transmit a discovery broadcast indicating a limited relaying capability. For example, UE 502-3 may set a flag in the discovery broadcast to indicate limited relaying (e.g., limited throughput, limited connectivity, etc.), to enable UE 502-1 to establish a connection to BS 504 to satisfy the limited relaying (e.g., to enable UE 502-1 to limit a data rate to correspond to the limited throughput). In some aspects, UE 502-3 may transmit a discovery broadcast indicating that the discovery broadcast is a response to a search signal rather than a periodic discovery broadcast. For example, UE 502-3 may set a flag in the discovery broadcast (e.g., a bit indicator) to indicate that the discovery broadcast is a response to a search signal, which may enable another UE 502 (e.g., UE 502-1) to determine that UE 502-3 is associated with an energy metric that does not satisfy the first type of energy metric threshold. In this case, based at least in part on receiving a first discovery broadcast from, for example, UE 502-2 and a second discovery broadcast from, for example, UE 502-3, UE 502-1 may select to use UE 502-2 as a relay based at least in part on a flag of the first discovery broadcast indicating that UE 502-2 is associated with a higher quality connection to BS 504 (e.g., UE 502-2 satisfies the first type of energy metric threshold and UE 502-3 does not satisfy the first type of energy metric threshold).

As shown in FIG. 5C, and at 516, based at least in part on receiving the discovery broadcast from UE 502-3, UE 502-1 may connect to BS 504 using UE 502-3 as a relay. For example, UE 502-1 may establish a connection to BS 504, and may transmit data to BS 504 via a first connection to UE 502-3 and a second connection from UE 502-3 to BS 504 (e.g., a direct second connection or a second connection with one or more intervening hops using one or more other UEs 502 as relays). Similarly, BS 504 may transmit data to UE 502-1 via the second connection to UE 502-3 and via the first connection between UE 502-3 and UE 502-1.

Although some aspects, described herein, are described in terms of each UE having a different functionality (e.g., UE 502-1 requesting a relay connection, UE 502-3 providing the relay connection, and/or the like), UEs may have multiple functionalities. For example, UE 502-1 may establish a relay connection to BS 504 using UE 502-3, and may be used, concurrently, as a relay for another UE 502 that is to connect to BS 504. Similarly, at a first time, UE 502-1 may transmit a search signal to establish a relay connection and, at a second time, UE 502-1 may connect to BS 504 and may transmit discovery broadcasts (e.g., persistent mode discovery broadcasts or transient mode discovery broadcasts) to enable another UE 502 to utilize UE 502-1 as a relay.

As indicated above, FIGS. 5A-5C are provided as examples. Other examples are possible and may differ from what was described with respect to FIGS. 5A-5C.

FIG. 6 is a flow chart of a method 600 of wireless communication. The method may be performed by a first UE (e.g., the UE 120, a UE 502, the apparatus 800/800', and/or the like).

At 610, the first UE may transmit a search signal to another UE. For example, the first UE may attempt to receive a discovery broadcast from at least one second UE, and may transmit the search signal to trigger a third UE to transmit a discovery broadcast based at least in part on failing to receive the discovery broadcast from the at least one second UE.

In some aspects, the first type of energy metric threshold is related to at least one of an energy load for a path to a base station, a remaining battery life, a quantity of hops of a connection to the base station, or a combination thereof. In some aspects, an energy metric threshold indicator of the first type of energy metric threshold is provided in a system information block message. In some aspects, the first type of energy metric threshold is associated with a time-scale for a connection to a network. In some aspects, the at least one second UE is a static UE and transmits the discovery broadcast in a persistent mode. In some aspects, the first UE is configured to receive another discovery broadcast from the at least one second UE and determine to utilize the at least one second UE as the relay based at least in part on receiving the other discovery broadcast.

In some aspects, the search signal is a relay-search signal. In some aspects, the search signal is device specific for the first UE and transmitted using a randomly or pseudo-randomly selected resource of a search frame. In some aspects, the search signal is transmitted toward a plurality of UEs including the third UE using a resource provisioned using a system information block message.

At 620, the first UE may determine to utilize the other UE as a relay based at least in part on a result of the search signal. For example, the first UE may receive a discovery broadcast, triggered by the search signal, from the third UE, and may determine to utilize the third UE as a relay for communication with the network based at least in part on receiving the discovery broadcast. In some aspects, the second type of energy metric threshold is different from the first type of energy metric threshold.

In some aspects, the third UE is operating in a transient mode and another discovery broadcast is received from the third UE in a transient discovery frame occurring after transmission of the search signal. In some aspects, the third UE is connected to a network using a fourth UE as another relay and wherein the fourth UE is associated with a fourth energy metric that satisfies the first type of energy metric threshold. In some aspects, a discovery broadcast, received by the first UE and from the third UE, indicates limited relaying, and the first UE is configured to connect to a network using the limited relaying.

In some aspects, the first UE is configured to utilize the third UE as the relay based at least in part on determining to utilize the third UE. In some aspects, a discovery broadcast, received by the first UE and from the third UE, includes an identifier of the first UE. In some aspects, the second type of energy metric threshold is related to at least one of an energy load for a path to a base station, a remaining battery life, a quantity of hops of a connection to the base station, or a combination thereof.

At 630, in some aspects, the first UE may utilize the other UE as the relay. For example, based at least in part on determining to utilize the third UE as the relay, the first UE may establish a connection to a network, such that the third UE relays communications between the first UE and the network. In some aspects, the first UE may communicate with the network via multiple hops, such as via the third UE and one or more other UEs. In some aspects, the first UE may transmit data to the network using the third UE as the relay and/or receive data from the network using the third UE as the relay.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
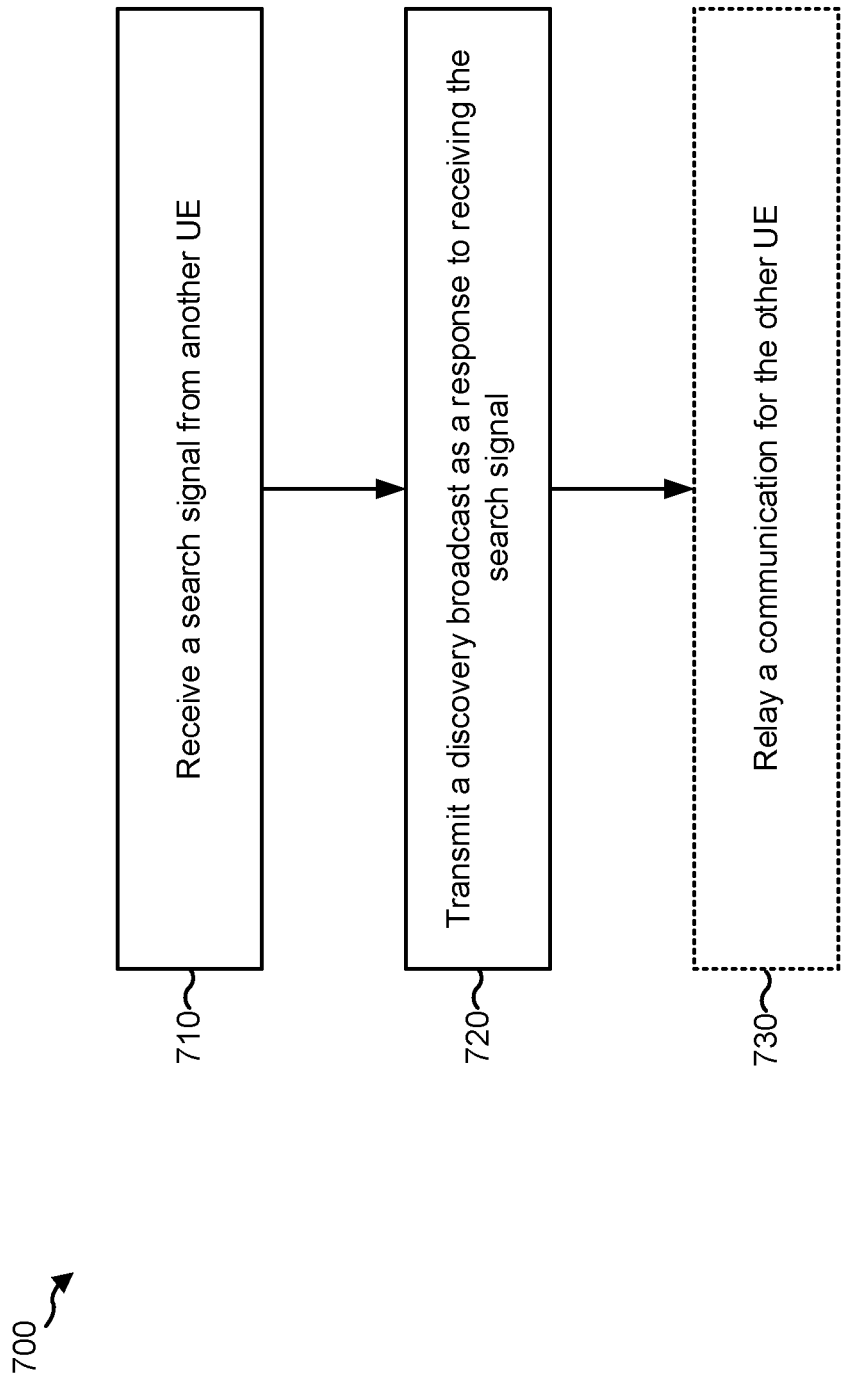
FIG. 7 is a flow chart of a method of wireless communication.

FIG. 7 is a flow chart of a method 700 of wireless communication. The method may be performed by a first UE (e.g., the UE 120, a UE 502, the apparatus 800/800', and/or the like).

At 710, the first UE may receive a search signal from another UE. For example, based at least in part on the second UE not receiving a periodically transmitted discovery broadcast from at least one third UE, the second UE may transmit, and the first UE may receive the search signal. In some aspects, a first energy metric, associated with the first UE does not satisfy a first type of energy metric threshold and a second energy metric of the first UE satisfies a second type of energy metric threshold that is different from the first type of energy metric threshold. In some aspects, the first type of energy metric threshold relates to transmitting discovery broadcasts periodically. In some aspects, the second type of energy metric threshold relates to transmitting discovery broadcasts as a response to receiving search signals.

In some aspects, the search signal is transmitted based at least in part on the second UE failing to receive a discovery broadcast from at least one third UE associated with a third energy metric that satisfies the first type of energy metric threshold. In some aspects, the first type of energy metric threshold is related to at least one of an energy load for a path to a base station, a remaining battery life, a quantity of hops of a connection to the base station, or a combination thereof. In some aspects, the second type of energy metric threshold is related to at least one of an energy load for a path to a base station, a remaining battery life, a quantity of hops of a connection to the base station, or a combination thereof.

At 720, the first UE may transmit a discovery broadcast as a response to receiving the search signal. For example, the first UE may transmit the discovery broadcast as a response to the search signal to enable the second UE to utilize the first UE as a relay for a connection to a network. In some aspects, the discovery broadcast is transmitted to the second UE. In some aspects, the discovery broadcast is transmitted to a plurality of UEs including the second UE. In some aspects, the discovery broadcast indicates limited relaying.

At 730, in some aspects, the first UE may relay a communication for the other UE. For example, based at least in part on transmitting the discovery broadcast, the first UE and/or the second UE may establish a connection to a network using the first UE as a relay for the second UE. In this case, the second UE may transmit data to and/or receive data from the network using the first UE as a relay. In some aspects, the second UE may relay data to the network via one or more other UEs.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
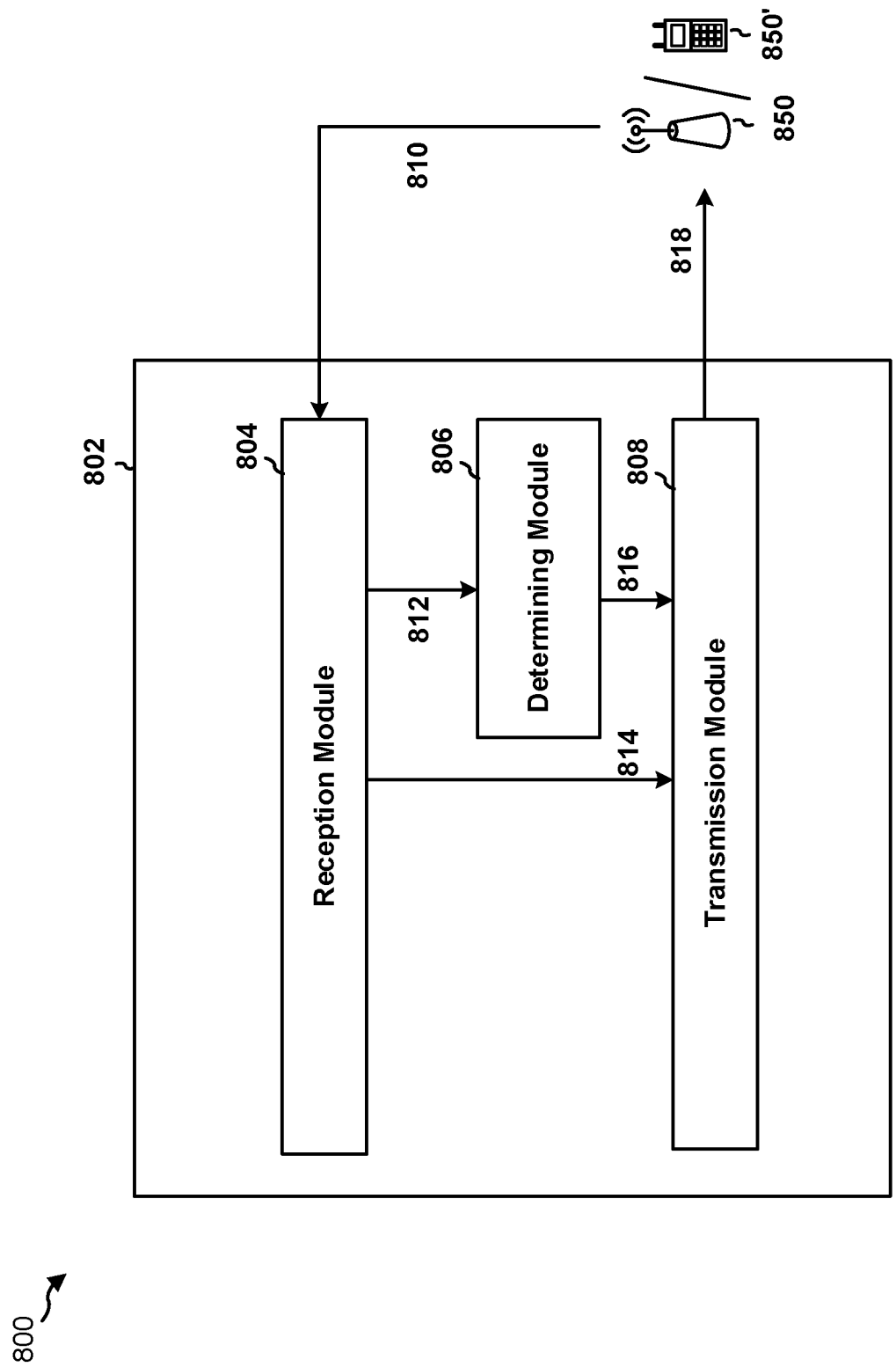
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a wireless device (e.g., a UE). In some aspects, the apparatus 802 includes a reception module 804, a determining module 806, and/or a transmission module 808.

The reception module 804 may receive, from a BS 850 and/or a wireless device 850' and as data 810, information associated with establishing a relay connection to BS 850. For example, the reception module 804 may receive a discovery broadcast from wireless device 850' based at least in part on the transmission module 808 transmitting a search signal to the wireless device 850' to establish the relay connection to BS 850 using wireless device 850' as a relay. Additionally, or alternatively, the reception module 804 may receive a search signal from the wireless device 850', and may cause the transmission module 808 to transmit a discovery broadcast to the wireless device 850' to enable the wireless device 850' to establish a relay connection to BS 850 using the apparatus 802 as a relay.

In some aspects, the reception module 804 may receive a communication from the BS 850 to relay to the wireless device 850' or a communication from the wireless device 850' to relay to the BS 850. Additionally, or alternatively, the reception module 804 may receive a communication from the wireless device 850', relayed from the BS 850, based at least in part on establishing the wireless device 850' as a relay for the apparatus 802. In some aspects, the reception module 804 may receive information relating to a network characteristic, such as information identifying an energy load for a path to the BS 850, a quantity of hops for a connection to the BS 850, and/or the like to enable the apparatus 802 to determine whether to transmit discovery broadcasts periodically (e.g., in a persistent mode), based at least in part on receiving a search signal (e.g., in a transient mode), and/or the like.

The determining module 806 may receive, from the reception module 804 and as data 812, information associated with determining whether to transmit a discovery broadcast, a search signal, and/or the like. For example, when the reception module 804 receives a discovery broadcast from the wireless device 850', the determining module 806 may determine to utilize the wireless device 850' as a relay for the apparatus 802. Additionally, or alternatively, when the reception module 804 receives a search signal from the wireless device 850', the determining module 806 may determine whether to transmit a discovery broadcast as a response to the search signal to enable the wireless device 850' to utilize the apparatus 802 as a relay for a connection to the BS 850.

In some aspects, the determining module 806 may determine whether to transmit the discovery broadcast periodically (e.g., in a persistent mode). For example, based at least in part on determining that the apparatus 802 is associated with a first energy metric that satisfies a first type of threshold (e.g., greater than a first threshold battery life), the determining module 806 may cause the apparatus 802 to transmit discovery broadcasts using network resources allocated for persistent mode discovery broadcasts. Alternatively, based at least in part on determining that the apparatus 802 is associated with a first energy metric that does not satisfy the first type of threshold (e.g., less than the first threshold battery life) and a second energy metric that does satisfy a second type of threshold (e.g., greater than a second threshold battery life that is less than the first threshold battery life), the determining module 806 may cause the apparatus 802 to transmit discovery broadcasts as a response to receiving search signals.

The transmission module 808 may receive, as data 814 and from the reception module 804, and as data 816 and from the determining module 806, information associated with transmitting data 818 to the BS 850 and/or the wireless device 850'. For example, the transmission module 808 may transmit a search signal to the wireless device 850' to trigger the wireless device 850' to transmit a discovery broadcast as a response to the search signal, and to enable the apparatus 802 to utilize the wireless device 850' as a relay. Additionally, or alternatively, the transmission module 808 may transmit a discovery broadcast to the wireless device 850' (e.g., as a response to receiving a search signal from the wireless device 850' or periodically) to enable the wireless device 850' to utilize the apparatus 802 as a relay. In some aspects, the transmission module 808 may transmit data to the wireless device 850' to cause the wireless device 850' to relay the data to the BS 850. Additionally, or alternatively, the transmission module 808 may transmit data received from the BS 850 to the wireless device 850' and/or received from the wireless device 850' to the BS 850 to relay for the wireless device 850'.

The apparatus may include additional modules that perform each of the blocks of the algorithm in the aforementioned flow chart of FIG. 6 and/or FIG. 7. As such, each block in the aforementioned flow chart of FIG. 6 and/or FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
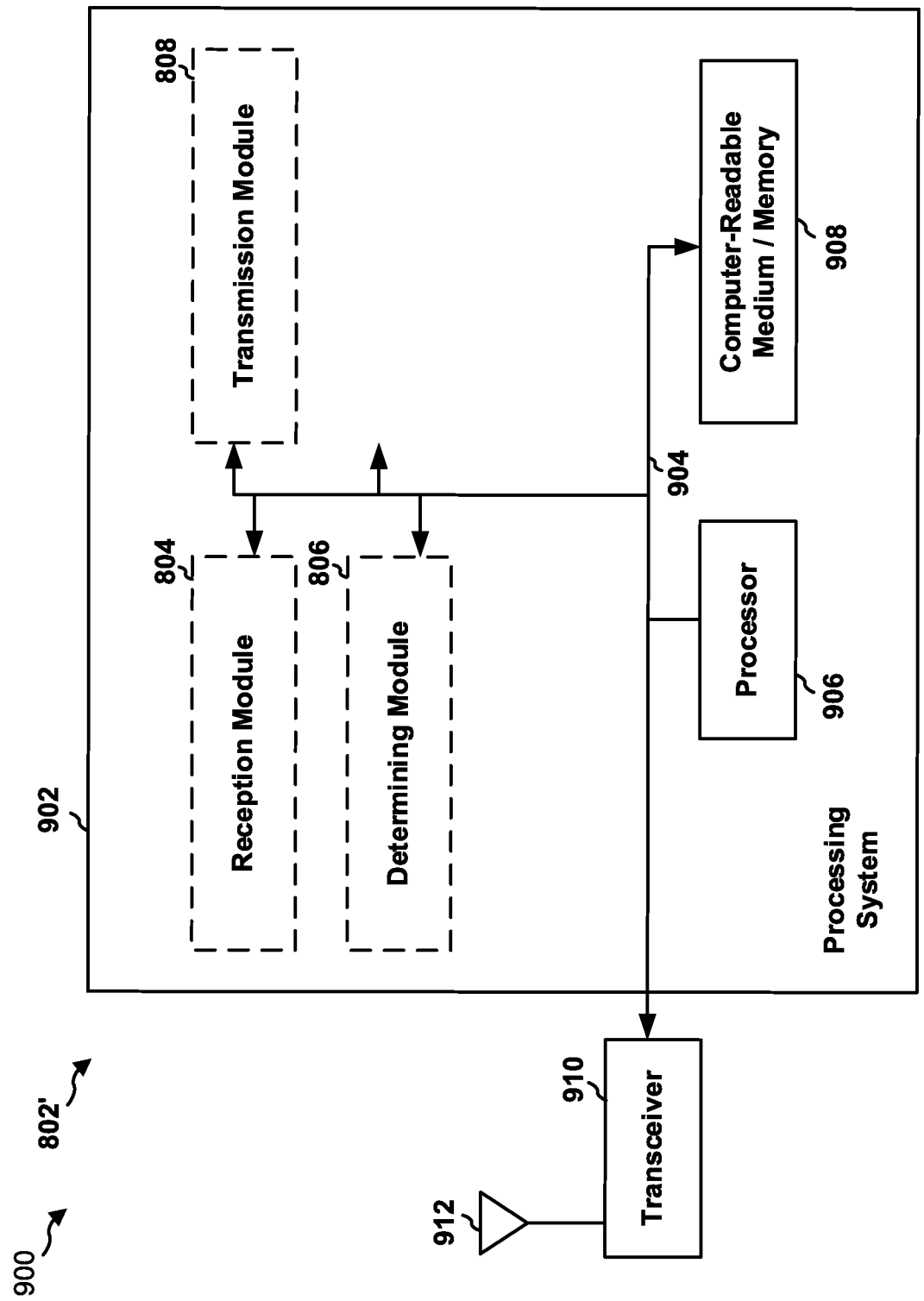
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a wireless device (e.g., a UE).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer readable medium/memory 908, one or more hardware modules coupled to the processor 906, or some combination thereof. The processing system 902 may be a component of the UE 120 and/or UEs 502 and may include the memory 282 and/or at least one of the TX MIMO processor 266, the RX processor 258, and/or the controller/processor 280.

In some aspects, the apparatus 802/802' for wireless communication includes means for transmitting a search signal based at least in part on failing to receive a discovery broadcast from at least one wireless device associated with a first energy metric that satisfies a first type of energy metric threshold, and means for determining to utilize another wireless device, associated with a second energy metric that does not satisfy the first type of energy metric threshold and a third energy metric that satisfies a second type of energy metric threshold, as a relay based at least in part on a result of the search signal. In some aspects, the apparatus 802/802' for wireless communication includes means for receiving a search signal from a wireless device, and means for transmitting a discovery broadcast based at least in part on receiving the search signal from the wireless device and based at least in part on an energy metric. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 9 is provided as an example. Other examples are possible and may differ from what was described in connection with FIG. 9.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a first user equipment (UE), comprising:

transmitting, by the first UE, a search signal based at least in part on failing to receive a discovery broadcast from at least one second UE associated with a first energy metric that satisfies a first type of energy metric threshold; and determining, by the first UE, to utilize a third UE as a relay based at least in part on a result of the search signal, wherein the third UE is associated with a second energy metric and a third energy metric, wherein the second energy metric is less than the first type of energy metric threshold, wherein the third energy metric satisfies a second type of energy metric threshold, wherein the second type of energy metric threshold is different from the first type of energy metric threshold, and wherein at least one of the first type of energy metric threshold or the second type of energy metric threshold is adapted to a transmission time scale.

2. The method of claim 1, wherein the first type of energy metric threshold is related to at least one of:
an energy load for a path to a base station,
a remaining battery life,
a quantity of hops of a connection to the base station, or
a combination thereof.

3. The method of claim 1, wherein an energy metric threshold indicator of the first type of energy metric threshold is provided in a system information block message.

4. The method of claim 1, wherein the first type of energy metric threshold is associated with a time-scale for a connection to a network.

5. The method of claim 1, wherein the at least one second UE is a static UE and transmits the discovery broadcast in a persistent mode.

6. The method of claim 1, wherein the first UE is configured to receive another discovery broadcast from the at least one second UE and determine to utilize the at least one second UE as the relay based at least in part on receiving the other discovery broadcast.

7. The method of claim 1, wherein the search signal is a relay-search signal.

8. The method of claim 1, wherein the search signal is device specific for the first UE and transmitted using a randomly or pseudo-randomly selected resource of a search frame.

9. The method of claim 1, wherein the search signal is transmitted toward a plurality of UEs including the third UE using a resource provisioned using a system information block message.

10. The method of claim 1, wherein the third UE is operating in a transient mode and another discovery broadcast is received from the third UE in a transient discovery frame occurring after transmission of the search signal.

11. The method of claim 1, wherein the third UE is connected to a network using a fourth UE as another relay and wherein the fourth UE is associated with a fourth energy metric that satisfies the first type of energy metric threshold.

12. The method of claim 1, wherein a discovery broadcast, received by the first UE and from the third UE, indicates limited relaying; and
wherein the first UE is configured to connect to a network using the limited relaying.

13. The method of claim 1, wherein the first UE is configured to utilize the third UE as the relay based at least in part on determining to utilize the third UE.

14. The method of claim 1, wherein a discovery broadcast, received by the first UE and from the third UE, includes an identifier of the first UE.

15. The method of claim 1, wherein the second type of energy metric threshold is related to at least one of:
an energy load for a path to a base station,
a remaining battery life,
a quantity of hops of a connection to the base station, or
a combination thereof.

16. A first user equipment (UE), comprising:
a memory; and
one or more processors coupled to the memory, the memory and the one or more processors configured to:
transmit a search signal based at least in part on failing to receive a discovery broadcast from at least one second UE associated with a first energy metric that satisfies a first type of energy metric threshold; and determine to utilize a third UE as a relay based at least in part on a result of the search signal,
wherein the third UE is associated with a second energy metric and a third energy metric,
wherein the second energy metric is less than the first type of energy metric threshold,
wherein the third energy metric satisfies a second type of energy metric threshold,
wherein the second type of energy metric threshold is different from the first type of energy metric threshold, and
wherein at least one of the first type of energy metric threshold or the second type of energy metric threshold is adapted to a transmission time scale.

17. The first UE of claim 16, wherein the first type of energy metric threshold is related to at least one of:
an energy load for a path to a base station,
a remaining battery life,
a quantity of hops of a connection to the base station, or
a combination thereof.

18. The first UE of claim 16, wherein an energy metric threshold indicator of the first type of energy metric threshold is provided in a system information block message.

19. The first UE of claim 16, wherein the first type of energy metric threshold is associated with a time-scale for a connection to a network.

20. A method of wireless communication by a first user equipment (UE), comprising:
receiving, by the first UE, a search signal from a second UE,
wherein the search signal is transmitted based at least in part on the second UE failing to receive a discovery broadcast from at least one third UE,
wherein a first energy metric of the first UE is less than a first type of energy metric threshold,
wherein a second energy metric of the first UE satisfies a second type of energy metric threshold,
wherein the second type of energy metric threshold is different from the first type of energy metric threshold,
wherein at least one of the first type of energy metric threshold or the second type of energy metric threshold is adapted to a transmission time scale,
wherein the first type of energy metric threshold relates to transmitting one or more discovery broadcasts periodically, and
wherein the second type of energy metric threshold relates to transmitting one or more discovery broadcasts as a response to receiving search signals; and
transmitting, by the first UE, a discovery broadcast based at least in part on receiving the search signal from the second UE and based at least in part on the second energy metric.

21. The method of claim 20, wherein the at least one third UE is associated with a third energy metric that satisfies the first type of energy metric threshold.

22. The method of claim 20, wherein the discovery broadcast is transmitted to the second UE.

23. The method of claim 20, wherein the discovery broadcast is transmitted to a plurality of UEs including the second UE.

24. The method of claim 20, wherein the discovery broadcast indicates limited relaying.

25. The method of claim 20, wherein the first type of energy metric threshold is related to at least one of:
an energy load for a path to a base station,
a remaining battery life, a quantity of hops of a connection to the base station, or a combination thereof.

26. The method of claim 20, wherein the second type of energy metric threshold is related to at least one of:
an energy load for a path to a base station,
a remaining battery life,
a quantity of hops of a connection to the base station, or a combination thereof.

27. A first user equipment (UE), comprising:
a memory;
one or more processors coupled to the memory, the memory and the one or more processors configured to:
receive a search signal from a second UE,
wherein the search signal is transmitted based at least in part on the second UE failing to receive a discovery broadcast from at least one third UE,
wherein a first energy metric of the first UE is less than a first type of energy metric threshold,
wherein a second energy metric of the first UE satisfies a second type of energy metric threshold,
wherein the second type of energy metric threshold is different from the first type of energy metric threshold,
wherein at least one of the first type of energy metric threshold or the second type of energy metric threshold is adapted to a transmission time scale,
wherein the first type of energy metric threshold relates to transmitting one or more discovery broadcasts periodically, and
wherein the second type of energy metric threshold relates to transmitting one or more discovery broadcasts as a response to receiving search signals; and
transmit a discovery broadcast based at least in part on receiving the search signal from the second UE and based at least in part on the second energy metric.

28. The first UE of claim 27, wherein the at least one third UE is associated with a third energy metric that satisfies the first type of energy metric threshold.

29. The first UE of claim 27, wherein the discovery broadcast is transmitted to the second UE.

30. The first UE of claim 27, wherein the discovery broadcast is transmitted to a plurality of UEs including the second UE.

* * * * *